Figure 1:
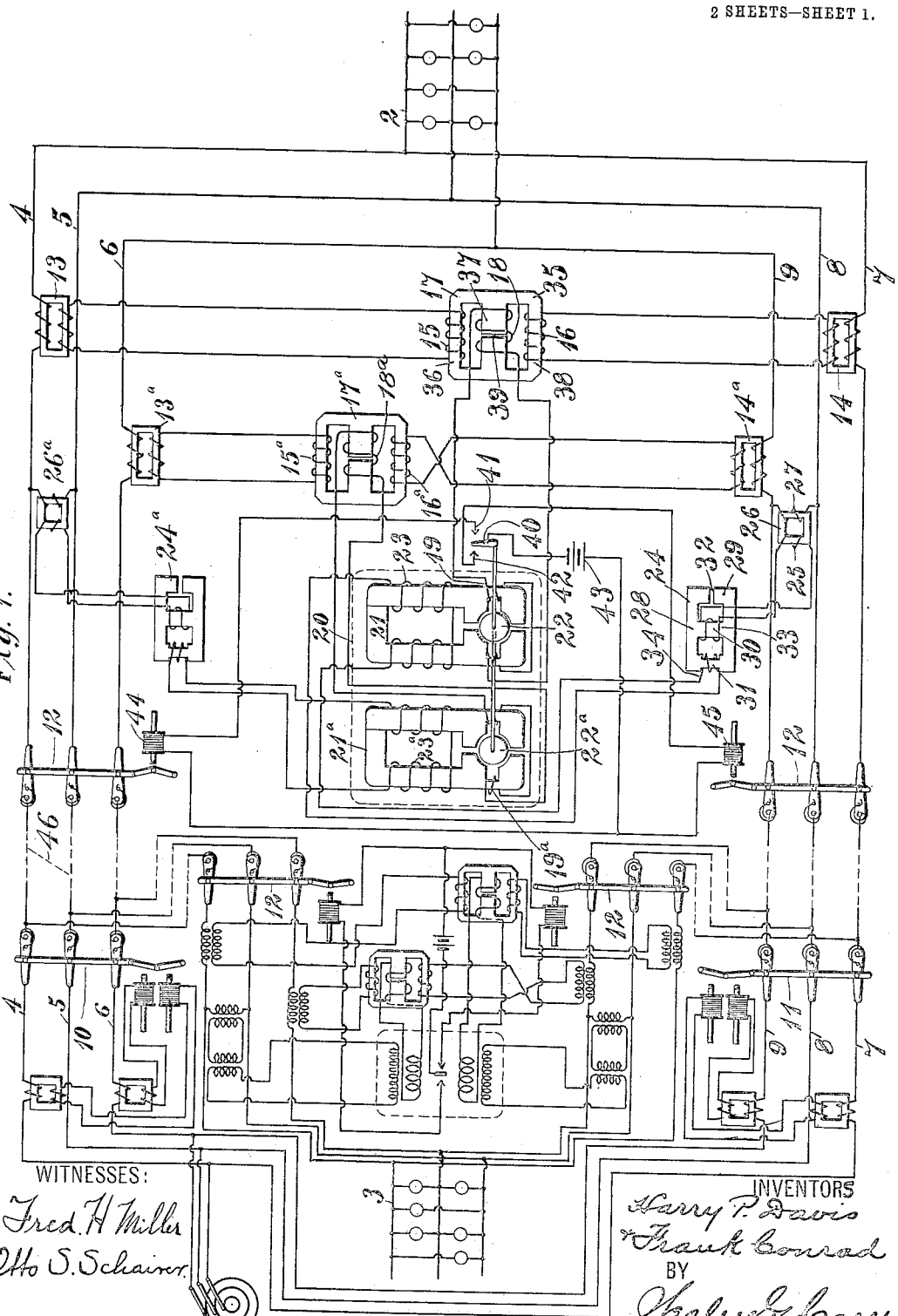

No. 840,479. PATENTED JAN. 8, 1907.
H. P. DAVIS & F. CONRAD.
PROTECTIVE APPARATUS FOR PARALLEL TRANSMISSION LINES.
APPLICATION FILED JAN. 30, 1905.

2 SHEETS—SHEET 1.

WITNESSES:
Fred H Miller
Otto S Schairer

INVENTORS
Harry P Davis
Frank Conrad
BY
Wesley G Carr
ATTORNEY

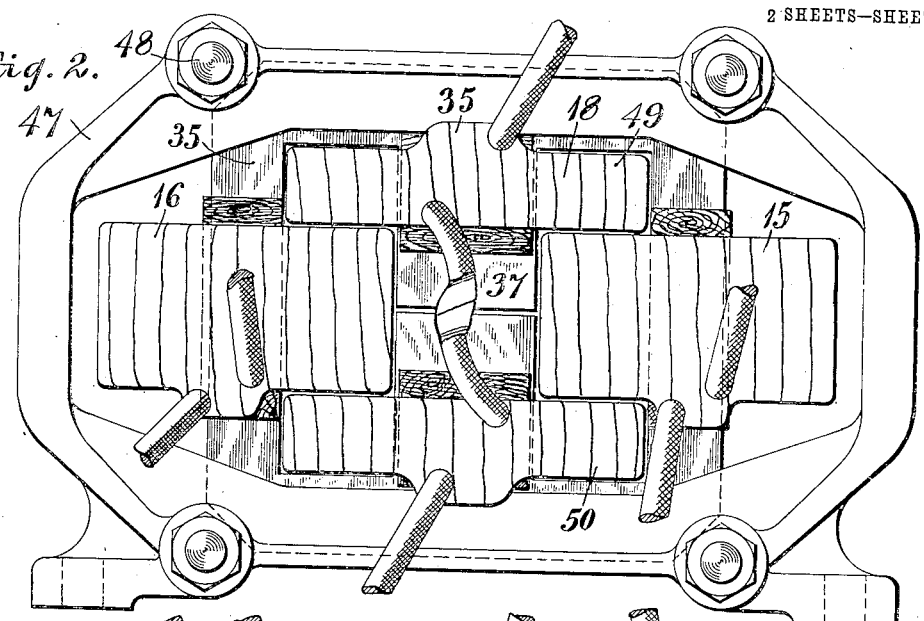
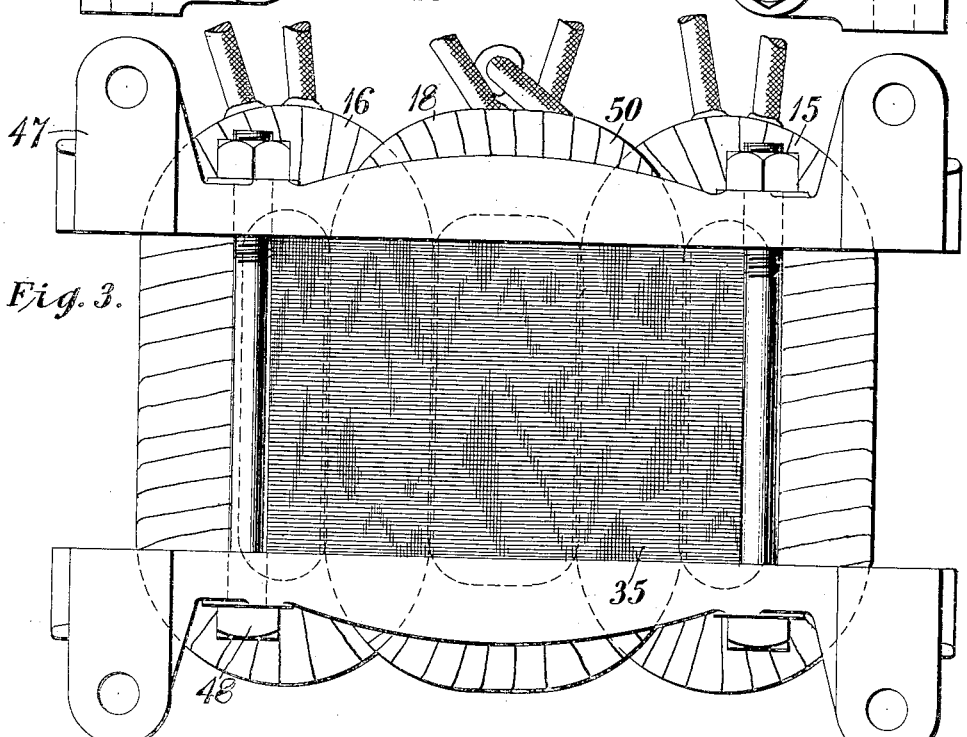

UNITED STATES PATENT OFFICE.

HARRY P. DAVIS, OF PITTSBURG, AND FRANK CONRAD, OF EDGEWOOD PARK, PENNSYLVANIA, ASSIGNORS TO WESTINGHOUSE ELECTRIC & MANUFACTURING COMPANY, A CORPORATION OF PENNSYLVANIA.

PROTECTIVE APPARATUS FOR PARALLEL TRANSMISSION-LINES.

No. 840,479.     Specification of Letters Patent.     Patented Jan. 8, 1907.

Original application filed January 20, 1904, Serial No. 189,903. Divided and this application filed January 30, 1905. Serial No. 243,313.

*To all whom it may concern:*

Be it known that we, HARRY P. DAVIS, a resident of Pittsburg, and FRANK CONRAD, a resident of Edgewood Park, in the county of Allegheny and State of Pennsylvania, citizens of the United States, have invented a new and useful Improvement in Protective Apparatus for Parallel Transmission-Lines, of which the following is a specification, this application being a division of our application, Serial No. 189,903, filed January 20, 1904.

Our invention relates to apparatus for the protection of high-tension transmission-lines; and its object is to provide means for interrupting the circuit in a line when the direction of flow of energy becomes reversed in any one of the conductors belonging to that line.

In transmitting electrical energy at high potentials over long distances it is a usual practice to employ two or more parallel lines. This is done for the purpose of avoiding the interruption of service which would occur in the event of an accident to a system embodying only a single line. It therefore becomes advisable to employ protective devices the operation of which will affect the injured line only.

Our invention is applicable to systems comprising one or more generating-stations from which energy is transmitted to distributing-points by means of parallel lines, at either or both ends of which we propose to place devices which are operated only when the direction of flow of energy through them is opposite to its normal direction, the direction of the flow of energy in alternating-current lines being defined as the direction of the drop of potential. One or both ends of the line may be protected also by means of ordinary overload devices if desired.

Our invention is illustrated in the accompanying drawings, in which—

Figure 1 is a diagrammatic view of a complete three-phase system with the connections of the devices properly made at distant ends of the lines. Fig. 2 is a view, in side elevation, of a transformer employed in connection with our system, and Fig. 3 is a plan view of the transformer shown in Fig. 2.

Referring now more particularly to Fig. 1, a three-phase generator 1 is represented as supplying energy to loads 2 and 3, through conductors 4, 5, and 6, and 7, 8 and 9, the line comprising conductors 4, 5, and 6 being in parallel with that comprising conductors 7, 8, and 9. A load 3, comprising suitable translating devices, is supplied from a branch circuit, which is connected to the main line at any desired or convenient point. At the generator end overload circuit-breakers are indicated at 10 and 11, and reverse current-breakers are indicated in the ends of the branch and main lines at 12. Series transformers 13 and 14, the primaries of which are respectively connected in the conductors 4 and 7 of the parallel lines, have their secondaries connected, respectively, in series with coils 15 and 16 of another transformer 17, a third coil 18 of which is energized only when the flow of energy in one of the coils 15 or 16 is reversed in direction. The coil 18 is connected to the current-winding 19 of a specially-constructed instrument 20, which comprises substantially two ordinary wattmeters 21 and 21$^a$, having their movable parts 22 and 22$^a$ mechanically connected. The voltage-winding 23 of the wattmeter 21 is supplied with energy through an intermediate transformer 24, from secondary winding 25 of a transformer 26, the primary winding 27 of which is connected between the conductors 8 and 9.

The transformer 24 is so constructed that an operating voltage may be maintained across the terminals of the voltage-winding 23 of the wattmeter 21 regardless of the fluctuations of the voltage of the line. It comprises an iron core 28, having three legs 29, 30, and 31, in one of the outer ones 29 of which is an air-gap 32, the other outer one 31 being of reduced cross-section. The primary winding 33 is placed upon the middle leg 30 and the secondary winding 34 upon the outer leg 31, having the reduced cross-section. The iron core at ordinary voltages is oversaturated, the extra flux being forced across the air-gap 32. If the voltage of the line drops considerably, there is still sufficient flux in the outer leg 31 of reduced cross-section to maintain an approximately constant voltage at the terminals of the secondary winding 34. The circuit connections of transformers 13ª, 14ª, 17ª, 24ª, and 26ª and wattmeter-windings 19ª and 23ª are substantially like those described for transformers 13, 14, 17, 24, and 26 and windings 19 and 23 and need not be repeated. The transformer 17, upon which the coils 15, 16, and 18 are wound, is also specially constructed in order that energy may be supplied to the winding 18 only when there is a reversal of the direction of the current in one of the conductors 4 and 7. The core 35 of this transformer comprises three legs 36, 37, and 38, the middle one, 37, of which is provided with an air-gap 39, the coil 18 being placed upon the middle leg 37 and the coils 15 and 16, respectively, upon the two outer legs 36 and 38. The coils 15 and 16 are so placed that they produce a circulating magnetic flux through the outer legs of the iron core. If the direction of the current becomes reversed in either one of these coils, the magnetic flux will be forced through the middle leg of the core, thus energizing the coil 18. It is, evident that there can be substantially no flux through the middle leg unless there is a positive reversal of the direction of the current in either the coil 15 or the coil 16, and it is also evident that the relative direction of the current in the coil 18 is dependent upon the line in which the direction of the flow of energy has been reversed.

The specially-constructed instrument 20, which comprises wattmeters 21 and 21ª, is provided for the purpose of selecting the line upon which a short circuit or other accident may have occured and for causing other suitable apparatus to operate to cut that line out of service. A reversal of the current direction in any one of the series transformers 13 or 13ª or 14 or 14ª causes wattmeter-needle 40 to swing against the one or the other of contact-terminals 41 and 42 and close a circuit through a battery 43 and the one or the other of circuit-breaker tripping-coils 44 and 45, according to the line on which the short-circuit has occurred.

The direction of movement of the wattmeter-needle 40 depends upon the relative directions of the currents in the current-coils 19 and 19ª, which directions are reversed from their normal directions by a reversal of the flow of energy in conductors 4, 5, and 6 or in conductors 7, 8, and 9, comprising the respective lines, because the coils 19 and 19ª are respectively in circuit with the transformer-windings 18 and 18ª, which are inactive so long as the line-currents preserve their normal directions, and therefore do not energize the said coils 19 and 19ª. When the coils 19 or the coils 19ª are energized, they produce a magnetic fluid that differs in phase from that produced by the coils 23 or the coils 23ª, which are constantly energized, and the resultant torque exerted upon the member 22 or the member 22ª produces a rotative movement of said members in the one direction or the other, according to the specific coils energized, and thus moves the needle 40 into engagement with either the terminal 41 or the terminal 42 to close the circuit of the proper circuit-breaker trip-coil. It is to be understood that any other suitable device may be employed which will satisfactorily select the injured line and cause it to be thrown out of service without altering the essential features of our invention.

The operation of the apparatus may be understood by assuming, for example, a short circuit at 46 between the conductors 4 and 5. The circuit-breakers at 10 being ordinary overload devices will open because of the excessive current through them and the short circuit. Energy will then be transmitted from the generator 1 over the conductors 7, 8, and 9 around to the short circuit at 46, through the series transformer 13 in a direction which is the reverse of its normal direction. As a result of this reversal the coil 18 becomes energized and transmits its energy to the current-coil 19 and causes the needle 40 to make contact with the point 41. The battery-circuit is now closed through the circuit-breaker-tripping coil 44, and the conductors 4, 5, and 6 are thrown out of service. The apparatus operates similarly for a short circuit between any of the other conductors of either line.

As illustrated in Figs. 2 and 3, the laminæ of the core 35 of the transformer 17 are clamped together by means of end plates 47 and bolts 48. The winding 18 may be divided into two coils 49 and 50, that may be placed on the middle leg 37 of the core 35, substantially as shown. The transformer may assume other proportions and dimensions than those herein specifically shown and described within the scope of our invention.

It is evident that we have provided such means for protecting parallel transmission-lines that an injured line, or one on which a short circuit may have occurred, may be automatically isolated or cut out of service without disturbing the parallel line. By varying a few of the minor details of the connections of the devices our invention may be employed in connection with transmission-lines having any number of phases, and we do not wish our invention limited, except by such restrictions as may be imposed by the prior art.

It is to be understood that our invention is not limited to the employment of a single generating-station for parallel lines, since the number and location of generating-stations may be varied in accordance with the lengths of the transmission-lines and other conditions of service.

We claim as our invention—

1. The combination, in an alternating-current system of electrical distribution having parallel distributing-lines, with circuit-breakers therefor, a polyphase-motor device for selecting and energizing the tripping-coil of the proper circuit-breaker, of means for energizing a winding of said motor device comprising a transformer having two primary windings and one secondary winding, the fluxes induced by the primary windings being normally in the same direction and the secondary winding being energized only when the directions of the fluxes induced by the two primary windings oppose each other.

2. A system of electrical distribution comprising a generating-station, parallel distributing-lines, circuit-breakers in each line near the distributing ends thereof, tripping-coils for said breakers energized from an auxiliary circuit, series transformers the primary windings of which are respectively in series with conductors of the distributing-lines and the secondary windings of which having the same phase are connected to relay-windings which normally produce fluxes in the same direction in a magnetic circuit, a third relay-winding which is energized only when the directions of the fluxes induced by the other two relay-windings oppose each other and means for selecting and closing the proper battery-circuit through one of said tripping-coils.

3. The combination, in an alternating-current system of electrical distribution having parallel distributing-lines and circuit-breakers therefor, of means for selecting and energizing the tripping-coil of the proper circuit-breaker comprising a relay-transformer having two primary windings which are respectively energized by currents proportional to the currents in the distributing-conductors and which normally induce fluxes in the same direction in a magnetic circuit, and secondary windings which are energized only when the directions of the fluxes induced by the primary windings oppose each other, current-windings in series with said secondary windings, voltage-windings receiving a voltage approximately proportional to the voltage between two of the distributing-conductors, and a switch actuated by said current and voltage windings for closing an auxiliary circuit through either of the said circuit-breaker tripping-coils.

4. In an alternating-current system of electrical distribution having parallel distributing-lines, a circuit-breaker in each of said lines, a polyphase electromagnetic device for closing the circuits of the tripping-coils of said breakers and means for energizing one of the windings of said electromagnetic device when the normal direction of current in one of the lines is reversed.

5. In an alternating-current system of electrical distribution having parallel distributing-lines, a circuit-breaker in each of said lines, a polyphase electromagnetic device for closing the circuits of the tripping-coils of said breakers, a transformer having primary windings supplied from the respective lines and having a secondary winding connected to one of the windings of the electromagnetic device, the effective circuit for the primary magnetic flux being outside the secondary winding except when the current is reversed in one of the primary windings.

6. In an alternating-current system of electrical distribution having parallel distributing-lines, a circuit-breaker in each line, a double electromagnetic circuit-closing device having voltage-coils and current-coils, means for supplying constant voltages from the lines to the voltage-coils and means for supplying current from the lines to the current-coils only when one of the line-currents is reversed from its normal direction.

7. In an alternating-current system of electrical distribution having parallel distributing-lines, a circuit-breaker for each line, a polyphase motor device, one of the windings of which is normally deënergized, and means for energizing said winding when the corresponding line-current is reversed from its normal direction, to effect operation of the corresponding circuit-breaker.

8. In an alternating-current system of electrical distribution having parallel distributing-lines, a circuit-breaker for each line, a polyphase-motor device for closing the circuits of the circuit-breaker tripping-coils, one of the field-windings of which is normally deënergized, and a transformer for energizing said winding when the current in the corresponding line is reversed.

In testimony whereof we have hereunto subscribed our names this 25th day of January, 1905.

HARRY P. DAVIS.
FRANK CONRAD.

Witnesses:
CAROLINE E. SMYERS,
BIRNEY HINES.